(12) United States Patent
Avellá Oliver et al.

(10) Patent No.: US 11,815,455 B2
(45) Date of Patent: Nov. 14, 2023

(54) DIFFRACTIVE DEVICE FOR CHEMICAL AND BIOLOGICAL ANALYSIS

(71) Applicants: UNIVERSITAT POLITECNICA DE VALENCIA, Valencia (ES); UNIVERSITAT DE VALENCIA, Valencia (ES)

(72) Inventors: José Miguel Avellá Oliver, Valencia (ES); Ángel Maquieira Catala, Valencia (ES); Augusto Miguel Juste Dolz, Valencia (ES); Maria Estrella Fernández Sánchez, Valencia (ES); Daniel Pastor Abellán, Valencia (ES); Pascual Muñoz Muñoz, Valencia (ES); Martina Delgado Pinar, Valencia (ES); Miguel Vicente Andrés Bou, Valencia (ES)

(73) Assignees: UNIVERSITAT POLITECNICA DE VALENCIA, Valencia (ES); UNIVERSITAT DE VALENCIA, Valencia (ES)

( * ) Notice: Subject to any disclaimer, the term of this patent is extended or adjusted under 35 U.S.C. 154(b) by 157 days.

(21) Appl. No.: 17/621,481

(22) PCT Filed: Jul. 6, 2020

(86) PCT No.: PCT/ES2020/070435
§ 371 (c)(1),
(2) Date: Dec. 21, 2021

(87) PCT Pub. No.: WO2021/009397
PCT Pub. Date: Jan. 21, 2021

(65) Prior Publication Data
US 2022/0349819 A1 Nov. 3, 2022

(30) Foreign Application Priority Data
Jul. 17, 2019 (ES) .................................. 201930661

(51) Int. Cl.
*G01N 21/47* (2006.01)

(52) U.S. Cl.
CPC . *G01N 21/4788* (2013.01); *G01N 2201/0635* (2013.01); *G01N 2201/08* (2013.01)

(58) Field of Classification Search
CPC ....... G01N 21/4788; G01N 2201/0635; G01N 2201/08; G01N 21/774; G01N 21/17
(Continued)

(56) References Cited

U.S. PATENT DOCUMENTS 5,324,933 A * 6/1994 Berkcan ............. G01D 5/35377
385/12
5,854,870 A * 12/1998 Helmfrid ............... G11B 7/127
359/328
(Continued)

FOREIGN PATENT DOCUMENTS

WO 9954714 A1 10/1999

OTHER PUBLICATIONS

Francesco Chiavaioli, "Biosensing with Optical Fiber Gratings", Article, 2017, 663-679, vol. 6, No. 4, Nanophotonics.
(Continued)

*Primary Examiner* — Isiaka O Akanbi
(74) *Attorney, Agent, or Firm* — Hayes Soloway PC

(57) ABSTRACT

The invention relates to a diffractive device for chemical and biological analysis based on structured receptors on waveguides, which comprises: a waveguide and a recognition element consisting of a grating with receptors arranged on the waveguide and are intended to interact with target compounds present in a sample; and a radiation source that emits an incident beam propagated through the waveguide, interacting with the recognition element and being diffracted according to Bragg's law, thereby generating a reflected beam and a transmitted beam, which are collected by optical
(Continued)

analyzers that record parameters of the reflected beam and of the transmitted beam, enabling multiple analyses to be conducted in a simple, fast, 15 sensitive and quantitative manner, label-free and in real time.

12 Claims, 2 Drawing Sheets

(58) Field of Classification Search
USPC .................................. 356/446, 448, 437, 481
See application file for complete search history.

(56) References Cited

U.S. PATENT DOCUMENTS

| | | | |
|---|---|---|---|
| 5,864,641 A | 1/1999 | Murphy | |
| 6,058,226 A * | 5/2000 | Starodubov | G02F 1/0118 385/127 |
| 6,603,902 B1 * | 8/2003 | So | G02F 1/0115 385/140 |
| 6,956,982 B1 * | 10/2005 | Heideman | G02B 6/10 385/5 |
| 7,489,835 B1 * | 2/2009 | Xia | G01N 21/774 385/12 |
| 8,547,553 B2 * | 10/2013 | Xia | G01N 21/774 356/444 |
| 9,689,752 B2 * | 6/2017 | Mori | G01K 11/32 |
| 9,891,166 B2 * | 2/2018 | Wild | E21B 47/10 |
| 2009/0263072 A1 * | 10/2009 | Albert | G01D 5/35316 385/12 |
| 2013/0084037 A1 * | 4/2013 | Xia | G01N 21/45 977/932 |
| 2016/0139115 A1 | 5/2016 | Fattinger | |
| 2017/0017075 A1 * | 1/2017 | Reddy | G02B 26/10 |
| 2019/0017938 A1 | 1/2019 | Holzapfel | |

OTHER PUBLICATIONS

Christophe Caucheteur, "Review of Plasmonic Fiber Optic Biochemical Sensors: Improving the Limit of Detection", Journal, 2015, 3883-3897, vol. 407, Analytical and Bioanalytical Chemistry.

Miquel Avella-Oliver, "Diffractive Protein Gratings as Optically Active Transducers for High-Throughput Label-Free Immunosensing", Article, 2017, 9002-9008, vol. 89, No. 17, Analytical Chemistry.

Xu-Dong Wang, "Fiber-Optic Chemical Sensors and Biosensors (2013-2015)", Article, 2016, 203-227, vol. 88, Analytical Chemistry.

Augusto Juste-Dolz, "Indirect Microcontact Printing to Create Functional Patterns of Physisorbed Antibodies", Article, 2018, 1-12, vol. 18, Sensors.

Miquel Avella-Oliver, "A label-free diffraction-based sensing displacement immunosensor to quantify low molecular weight organic compounds", 2018, 173-179, vol. 1033, Analytica Chimica Acta.

* cited by examiner

DIFFRACTIVE DEVICE FOR CHEMICAL AND BIOLOGICAL ANALYSIS

CROSS-REFERENCE TO RELATED APPLICATIONS AND PRIORITY

This patent application claims priority from PCT Application No. PCT/ES2020/070435 filed Jul. 6, 2020, which claims priority from Spanish Patent Application No. P201930661 filed Jul. 17, 2019. Each of these patent applications are herein incorporated by reference in their entirety.

OBJECT OF THE INVENTION

The object of the present invention relates to a diffractive device for chemical and biological analysis based on structured receptors on waveguides.

BACKGROUND OF THE INVENTION

Chemical and biological analysis techniques play a fundamental role in a number of key areas in current living standards, such as clinical diagnosis, environmental analysis, food safety, quality control in the industry, and scientific innovation, among many others.

Society today demands inexpensive, compact, simple, sensitive and robust systems which allow chemical and biological analyses to be conducted in situ, outside of laboratories and hospitals, and by non-specialised users. Some notable examples of these analysis systems are glucose meters and pregnancy tests.

In the particular framework of the present invention, there are currently three lines relating to the development of devices intended for chemical and biological analysis that should be mentioned. First, there are biogratings (*Anal. Chem.* 2017, 89, 9002-9008; *Anal. Chim. Acta* 2018, 1033, 173-719; *Sensors* 2018, 18, 3163), which are diffractive gratings of bioreceptors arranged on non-structured solid surfaces.

These gratings are interrogated by means of diffraction-based sensing, which is based on irradiating biogratings in free space (unguided radiation) and recording the intensity of the orders diffracted in free space to quantify the magnitude of the biointeraction.

The second line is the one described in document US 2016/0139115 A1 and consisting of creating biogratings arranged according to a Fresnel lens structure on a planar waveguide, such that they interact with the guided radiation to diffract in free space according to a diffracted pattern defined by a point, the intensity of which is linked with the biointeraction of interest.

Moreover, within in this second line, document US 2019/0017938 A1 describes the same principle, with the difference being that the biograting couples the incident beam to the planar waveguide, instead of decoupling it from the free space.

The third line consists of fibre Bragg gratings (FBGs) and long-period fibre gratings (LPGs) (*Anal. Bioanal. Chem.* 2015, 407, 3883-3897; *Nanophotonics* 2017, 6, 663-679; *Anal. Chem.* 2016, 88, 203-227). In both, optical fibres are irradiated to record in their core periodic variations in the refractive index capable of interacting with the incident beam according to Bragg's law.

In a bioanalytical application, non-structured layers of receptors are arranged on FBGs and LPGs, commonly on a layer of gold introduced to generate plasmonic phenomena.

Lastly, document WO99/54714A1 describes an integrated optical waveguide device comprising a light transmitting layer and an activable element divided into several segments. Different groups of segments show different refractive indices, or materials having a different degree of activation. This device can be used as a sensor, modulator or spectrometer.

In any case, there are a series of aspects which these three lines cannot resolve. Firstly, there is a need to develop label-free systems for quantitative analysis in non-specialised settings. Secondly, most of these technologies are unable to discriminate the signal contributions generated by non-specific interactions, so it is impossible to analyse complex real samples selectively, minimising the sample preparation steps.

DESCRIPTION OF THE INVENTION

The diffractive device for chemical and biological analysis object of the present invention provides solutions to these aspects that have yet to be solved in the field of chemical and biological analysers, such as the development of label-free systems for quantitative analyses in non-specialised settings.

This device also allows biomolecular interactions to be measured in real time, multiple analyses to be recorded in a single measurement (multiplexing) and it has great potential for devising miniaturised analysers (lab-on-a-chip), that are compact and portable (point-of-care).

It furthermore solves non-specific adsorption problems in the analysis of complex samples (blood, serum, saliva, etc.). Unlike most technologies present in the state of the art, it can discriminate signal contributions generated by non-specific interactions. This allows complex real samples to be selectively analysed and by minimising the sample preparation steps.

Furthermore, it is a device that can be miniaturised and integrated in telecommunications systems, and it is simple and compatible with inexpensive and technologically available materials and devices, which confers it with the capacity to be implemented in hand-held devices.

Namely, the device object of the present invention comprises a waveguide, preferably a planar waveguide integrated in a substrate or an optical fibre, with an inlet at one end, an outlet at the opposite end, and a test area in the central part on which there is positioned a recognition element.

The chemical composition of the waveguide can be made of glass, doped glass, silicon, doped silicon, or polymers, such as polymethylmethacrylate or polystyrene, between other materials.

The recognition element comprises a grating with receptors arranged on the test area. The grating with receptors is a set of elements, such as organic molecules, biomacromolecules, microorganisms or biomimetic synthetic compounds, structured according to a diffraction grating that meets Bragg's law. The grating with receptors is intended to selectively interact with target compounds present in a sample to be analysed.

Namely, the grating with receptors could be a set of antibodies, enzymes, proteins, nucleic acids, molecularly imprinted polymers, polysaccharides, hapten-protein complexes, organic molecules, bacteria, viruses or tissues.

The target compounds with which the grating with receptors interacts can be metabolites, drugs, medicinal products, contaminants, biomarkers, pathogens, chemical weapons, biological weapons or allergenic agents.

The grating with receptors is distributed over the test area of the waveguide forming areas with immobilised receptors alternating with gaps without receptors. This structure of areas with immobilised receptors and gaps is distributed periodically over the test area. The morphology and dimensions of this structure is such that it meets Bragg's law.

The analytical sensitivity of this device increases with several parameters and, in particular, with the length of the test area on which the grating with receptors is distributed, a property that allows the sensitivity of the device to be adapted to the sensitivity required for each application.

The grating with receptors can be manufactured by means of techniques such as microcontact printing, photolithography, laser beam interference or holographic techniques.

The immobilisation of the grating with receptors on the test area can be done by means of physisorption or covalent anchoring processes such as thiol-eno coupling or carbodiimide reaction.

Said immobilisation may require a prior step for activation/functionalisation of the test area, such as ultraviolet irradiation, treatment of organosilanes or treatment with ozone. Likewise, the immobilisation of the grating with receptors can be done by means of using compounds such as hydrogels, proteins A and G, avidin or streptavidin or biotinylated products.

The recognition element may further comprise blocking agents which are positioned in the gaps without receptors. Blocking agents improve the analytical performance of the device. The blocking agents can be, for example, proteins, surfactants or glycols.

Moreover, the device also comprises an electromagnetic radiation source that emits an incident beam towards the inlet of the device, the incident beam propagating through the waveguide.

The incident beam interacts with the recognition element, which diffracts it according to Bragg's law, thereby generating a reflected beam and a transmitted beam. The reflected beam exits through the inlet of the waveguide and the transmitted beam through the outlet of the waveguide.

The radiation source generates electromagnetic radiation, preferably in the ultraviolet, visible or infrared spectrum, which can be monochromatic or polychromatic. Some examples of radiation sources could be lasers, supercontinuum sources, LED diodes, incandescent lamps and halogen lamps.

To analyse both beams, the device comprises at least one optical analyser capable of recording the parameters of the electromagnetic radiation beams.

The optical analyser is positioned between the radiation source and the inlet of the waveguide and is intended to record the optical parameters of the reflected beam. The analyser can also be positioned at the outlet of the waveguide and be intended to record the optical parameters of the transmitted beam.

The optical analysers can be spectrophotometers, optical spectrum analysers, photodiodes or CMOS cameras.

Some of the optical parameters of interest to be measured by the optical analysers are the wavelength, frequency, amplitude, intensity or phase of the beams.

To enable analysing a sample of interest, said sample must be in contact with the test area. The target compounds present in the sample interact with the grating with receptors, with this interaction modifying the amount of matter present in the areas with receptors with respect to the gaps, which affects the optical magnitudes of the reflected beam and/or of the transmitted beam.

Therefore, by measuring the optical parameters of the reflected beam and/or of the transmitted beam, the chemical and biological parameters of analytical interest relating to the receptors, the target compounds and/or the interaction between both can be quantified.

Some chemical and biological parameters of the sample which can be analysed using the present invention are the concentration of the target compound in the sample, the activity of the target compound, the surface density of the receptors, the activity of the receptors, and the kinetic and thermodynamic constants involved in the interaction between receptors and target compounds.

The device may further comprise a first optical device situated between the radiation source and the inlet of the waveguide and a second optical device positioned at the outlet of the waveguide.

Both optical devices modify the optical properties of the radiation beams for adapting their coupling and guiding through the waveguide, their interaction with the recognition element and/or subsequent record in the optical analysers. The optical devices can also be intended to discriminate beams which are propagated through the waveguide.

The first optical device and the second optical device can be polarisation controllers, polarisers, attenuators, monochromators, circulators, couplers, Bragg gratings or long-period gratings, and they can also integrate more than one of these elements.

The waveguide can have different morphologies in parts or in its entire extension for adapting the propagation of the beams and the measurement thereof, and they can be formed by one or multiple layers.

The device may further comprise coatings which are situated on the waveguide. The coatings may comprise one or more layers conferring mechanical properties to the waveguide and improving the optical response by adapting the propagation of the radiation beams through same.

Part of the radiation emitted by the radiation source is propagated through the waveguide, as well as along its surface, interacting with the recognition element. To facilitate this interaction, both the waveguide and the coating can have modifications, such as alterations in the morphology and composition of the waveguide and of the coating.

The device object of the invention can be positioned on a support which supports all the elements forming it and may additionally comprise fluidic systems (pumps, channels, chambers, etc.) to automate the handling of samples and solutions.

The device allows multiplexing by means of the incorporation in the test area of several recognition elements located in series and each one structured with diffraction gratings having a different period. Each recognition element will thereby produce a signal in reflection and in transmission localised in different areas of the optical spectrum, which allows for the univocal identification thereof.

DESCRIPTION OF THE DRAWINGS

To complement the description that is being made and for the purpose of helping to better understand the features of the invention according to a preferred practical exemplary embodiment thereof, a set of drawings is attached as an integral part of said description in which the following is depicted in an illustrative and non-limiting manner.

PREFERRED EMBODIMENT OF THE INVENTION

Below, an exemplary embodiment of the diffractive device for chemical and biological analysis is described with the aid of FIGS. 1 to 4.

Figure 1:
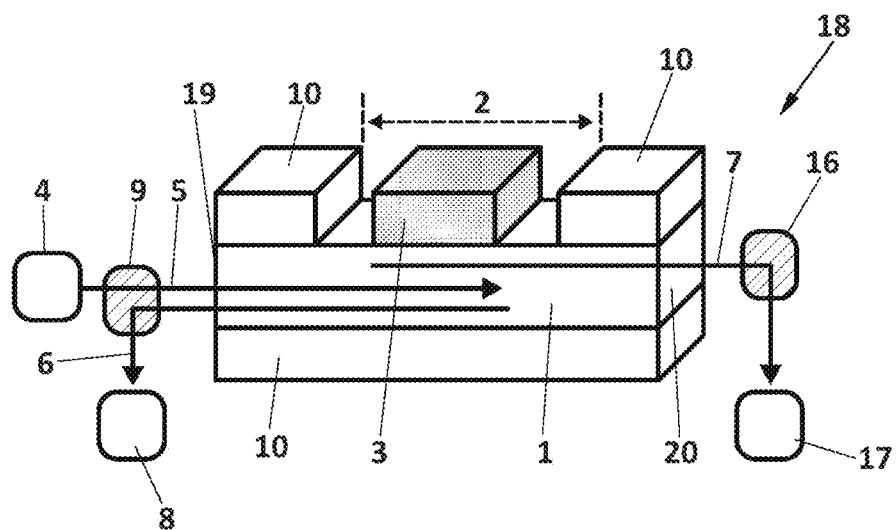
FIG. 1 shows a general diagram of a first embodiment of the diffractive device for chemical and biological analysis.
Figure 2:
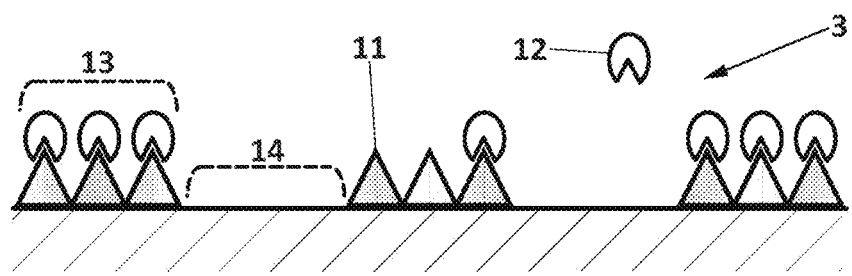
FIG. 2 shows a detailed diagram of the grating with receptors of the recognition element.
Figure 3:
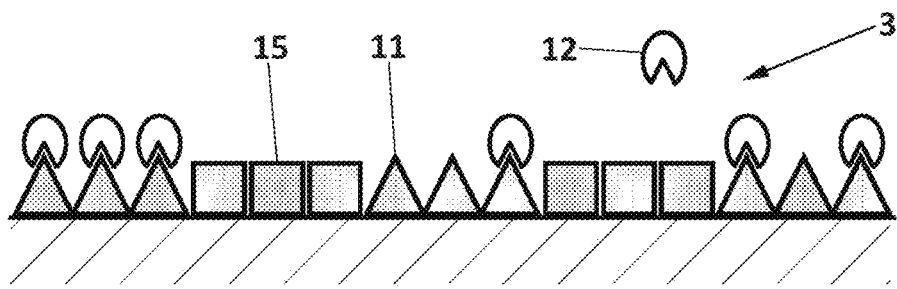
FIG. 3 shows a detailed diagram of the recognition element when it further comprises the blocking agents.

The device (18) object of the present invention, which is shown in FIG. 1 in a first embodiment, comprises a waveguide (1) which is a planar waveguide (1) integrated in a substrate, and comprising an inlet (19) at one end, an outlet (20) at the opposite end and a test area (2). A recognition element (3) is positioned on the test area (2).

Figure 4:
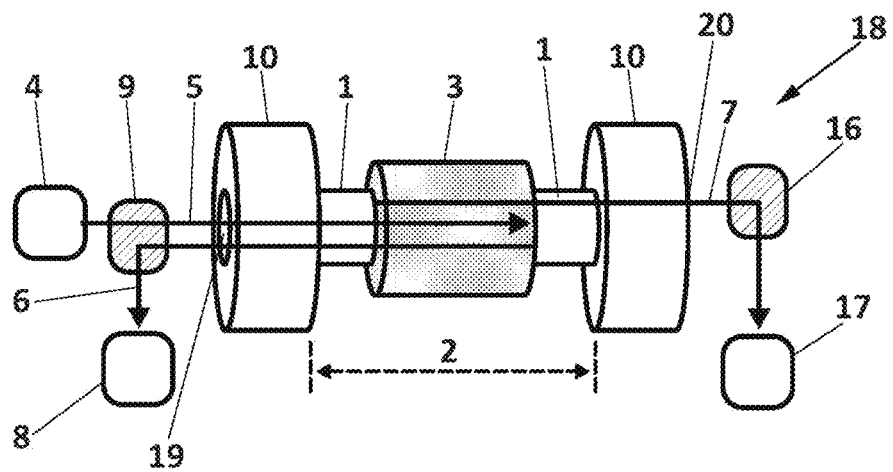
FIG. 4 shows a general diagram of a second embodiment of the diffractive device for chemical and biological analysis.

In a second embodiment of the invention, shown in FIG. 4, the waveguide (1) is a cylindrical fibre and the recognition element (3) is positioned surrounding same in the part comprising the test area (2), with the waveguide (1) and the recognition element (3) being concentric.

Namely, in this second embodiment, the waveguide (1) is a single-mode optical fibre 125 micrometres in diameter. The test area (2) is generated by means of the tapering of the waveguide (1) to a diameter of between 1 and 5 micrometres. The tapering is done mechanically by combining drawing and heating with a flame.

In turn, the recognition element (3) comprises a grating with receptors (11) that is arranged on the test area (2) of the waveguide (1). The grating with receptors (11) is manufactured by means of microcontact printing and covalently immobilised.

The grating with receptors (11) is distributed over the test area (2) forming areas with immobilised receptors (13) alternating with gaps (14) without receptors. This structure of areas with receptors (13) and gaps (14) is distributed periodically over the test area (2). The receptors (11) forming the areas with receptors (13) are proteins.

The recognition element (3) also comprises blocking agents (15) which are positioned in the gaps (14) without receptors. The blocking agents (15) are polysorbate molecules.

The areas with receptors (13) and gaps (14) have the same dimensions, extend in a rectilinear manner in the direction transverse to the test area (2) with a periodicity of around 550 nanometres.

Furthermore, the device (18) comprises a radiation source (4) connected to the inlet (19) of the waveguide (1) that emits an incident beam (5) towards the inlet (19), and said beam is propagated through the waveguide (1).

The radiation source (4) is a 1.3 mW SuperLed lamp with a maximum emission of 1550 nm, which is connected to the waveguide (1).

The incident beam (5) interacts with the recognition element (3) thereby generating a reflected beam (6) and a transmitted beam (7). The reflected beam (6) exits through the inlet (19) of the waveguide (1) and the transmitted beam (7) through the outlet (20) of the waveguide (1).

To perform analysis of a liquid sample containing antibodies constituting target compounds (12), said sample is incubated on the test area (2), and its concentration is quantified after incubation through the information collected from the reflected beam (6) or the transmitted beam (7).

Namely, the maximum peak intensity of the reflected beam (6) and the minimum trough intensity of the transmitted beam (7) are determined.

The device (18) further comprises a first optical device (9) situated between the radiation source (4) and the inlet (19) of the waveguide (1) and a second optical device (16) positioned close to the outlet (20) of the waveguide (1). Both optical devices (9, 16) comprise a polariser, a polarisation controller and a circulator.

The device (18) also comprises a first optical analyser (8) and a second optical analyser (17), capable of recording the parameters of the electromagnetic radiation beams.

The first analyser (8) is positioned between the radiation source (4) and the inlet (19) of the waveguide (1) and is intended to record the optical parameters of the reflected beam (6). The second analyser (17) is positioned close to the outlet (20) of the waveguide (1) and is intended to record the optical parameters of the transmitted beam (7).

The optical analysers (8, 17) are optical spectrum analysers for the infrared range, connected to the waveguide (1) through the optical devices (9, 16).

In a third embodiment of the invention, a portion of the test area (2) is laterally removed to generate a flat surface (D-shaped fibres), and even part of the waveguide (1) can be removed. Test areas (2) of this type can be obtained by means of mechanical polishing or by means of chemical solution.

Furthermore, the waveguide (1) and/or the optical devices (9, 16) comprise additional elements such as Bragg gratings or long-period gratings to modify the optical properties of the radiation beams (5, 6, 7) and/or the interaction thereof with the grating with receptors (11), such that it allows, for example, different optical responses to be obtained.

The device (18) may also comprise different recognition elements (3), each one having its optical response tuned to a different wavelength, modifying the period of the grating with receptors (11) and/or the inclination thereof with respect to the waveguide (1), or the dimensions of the test area (2), such that they have different and non-overlapping spectral responses in the reflected beam (6) and/or transmitted beam (7), thus allowing different multiple analyses to be conducted in a single sample.

When needed, multiple test areas (2) can be joined together in series or in parallel, each one with at least one recognition element (3), all of them being tuned to different wavelengths modifying the period of the grating with receptors (11) and/or the inclination thereof with respect to the test area (2) and/or the geometry or composition of the waveguide (1) over the test area (2).

Each test area (2) thereby has a different spectral response in the reflected beam (6) and/or the transmitted beam (7), thereby allowing multiple analyses to be conducted both in a single sample and in multiple samples.

Information about the beams during the actual incubation of the sample can be recorded by using the device (18), such that real-time information is obtained about the biorecognition events of the target compound (12), on the basis of which the concentration of the target compound (12) and/or the affinity constants between the receptors (11) and the target compound (12) is determined.

The invention claimed is:

1. A diffractive device for chemical and biological analysis intended to analyze a sample comprising target compounds, wherein it comprises:
   a waveguide with an inlet at one end, an outlet at an opposite end and a test area on which there is positioned, a recognition element comprising a grating with receptors distributed across the test area forming areas with receptors alternating with gaps without receptors, the areas with receptors and gaps being structured periodically according to a diffraction grating that meets Bragg's law, and the recognition element being intended to interact with the target compounds, a radiation source that emits an incident beam towards the inlet of the waveguide that is propagated through same and diffracted by the recognition element, meeting Bragg's law, thereby generating a reflected beam exiting through the inlet and a transmitted beam exiting through the outlet, and at least one optical analyzer that records optical parameters of the reflected beam and/or of the transmitted beam.

2. The device according to claim 1, wherein it further comprises a first optical device situated between the radiation source and the inlet of the waveguide intended to modify the radiation beams.

3. The device according to claim 2, wherein the first optical device is a device selected from a polarization controller, a polarizer, an attenuator, a monochromator, a circulator, a coupler, a Bragg grating and a long-period grating.

4. The device according to claim 1, wherein it further comprises a second optical device positioned at the outlet of the waveguide intended to modify the radiation beams.

5. The device according to claim 1, wherein the radiation source is a device selected from a laser, a LED diode, an incandescent lamp and a halogen lamp.

6. The device according to claim 4, wherein the second optical device is a device selected from a polarization controller, a polarizer, an attenuator, a monochromator, a circulator, a coupler, a Bragg grating and a long-period grating.

7. The device according to claim 1, wherein the waveguide is a waveguide selected from an optical fibre, a tapered optical fibre, a D-shaped optical fibre and an integrated optical guide.

8. The device according to claim 1, wherein the waveguide is made of a material selected from glass, doped glass, silicon, doped silicon, polymers, polymethylmethacrylate and polystyrene.

9. The device according to claim 1, wherein it further comprises coatings positioned on the waveguide conferring mechanical and optical properties to the waveguide.

10. The device according to claim 1, wherein the grating with receptors is a set of elements selected from antibodies, enzymes, proteins, nucleic acids, molecularly imprinted polymers, polysaccharides, hapten-protein complexes, bacteria, viruses and tissues.

11. The device according to claim 1, wherein the recognition element further comprises blocking agents which are positioned in the gaps without receptors.

12. The device according to claim 1, wherein the first optical analyzer and the second optical analyzer are selected from a spectrophotometer, an optical spectrum analyzer, a photodiode and a CMOS camera.

* * * * *